(12) United States Patent
Klevans (10) Patent No.: US 6,885,677 B1
(45) Date of Patent: Apr. 26, 2005

(54) MULTIPROTOCOL LABEL SWITCHING ROUTERS

(75) Inventor: Richard L. Klevans, Raleigh, NC (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/674,315

(22) PCT Filed: Mar. 9, 2000

(86) PCT No.: PCT/US00/06082
§ 371 (c)(1),
(2), (4) Date: Oct. 26, 2000

(87) PCT Pub. No.: WO00/56017
PCT Pub. Date: Sep. 21, 2000

Related U.S. Application Data

(60) Provisional application No. 60/124,063, filed on Mar. 12, 1999.

(51) Int. Cl.$^7$ .................................................. H04J 3/16
(52) U.S. Cl. ................................................... 370/466
(58) Field of Search ...................... 370/466, 390–398, 370/230–235, 350–356, 400, 360, 236.2, 248, 241; 709/238, 242, 227, 237

(56) References Cited

U.S. PATENT DOCUMENTS

| | | | |
|---|---|---|---|
| 5,341,364 A | 8/1994 | Marra et al. ............... 370/16.1 |
| 5,442,620 A | 8/1995 | Kremer ...................... 370/16.1 |
| 5,442,623 A | 8/1995 | Wu ............................ 370/16.1 |
| 5,502,586 A | 3/1996 | Ohnsorge ................... 359/117 |
| 5,625,478 A | 4/1997 | Doerr et al. ................ 358/125 |
| 5,636,205 A | 6/1997 | Suzuki et al. ............... 370/224 |
| 5,717,796 A | 2/1998 | Clendening .................. 385/24 |
| 5,799,001 A | 8/1998 | Lee et al. ................... 370/220 |
| 5,870,212 A | 2/1999 | Nathan et al. .............. 359/119 |
| 5,974,463 A * | 10/1999 | Warrier et al. .............. 709/225 |
| 5,996,021 A * | 11/1999 | Civanlar et al. ............ 709/238 |
| 6,108,304 A * | 8/2000 | Abe et al. ................... 370/232 |
| 6,363,053 B1 * | 3/2002 | Schuster et al. ............ 370/230 |
| 6,408,001 B1 * | 6/2002 | Chuah et al. ............... 370/392 |
| 6,501,754 B1 * | 12/2002 | Ohba et al. ................. 370/389 |
| 6,526,056 B1 * | 2/2003 | Rekhter et al. ............. 370/392 |

FOREIGN PATENT DOCUMENTS

| | | | |
|---|---|---|---|
| EP | 0 920 153 A2 | 6/1999 | ............ H04J/14/02 |
| EP | 0 949 777 A2 | 10/1999 | ............ H04J/14/02 |

OTHER PUBLICATIONS

Katsube, Y et al, Study on ATM Label Switching Network Architecture, May 1998, ATM Workshop Proceedings, IEEE, ppgs. 43–50.*
Nagami et al, VCID Notification Over ATM link, Aug. 1998, Proceedings, ppgs. 1–12.*
Junipr Network Press Release, First routing operating system for high–growth Internet backbone networks, Jul. 1, 1998, pp. 1–3; www.juniper.net/company/presscenter/pr/pr–1998.html.*
James Ballintine, Proposed OCh–OH Assignments for the OCh Frame,Contribution to T1 Stantards Project—T1X1.5, Lucent Technologies, pp. 1–7, May 10–12, 1999.
Types and Characteristics of SDH Network Protection Architectures, Digital Networks, International Telecommunication Union, pp. 1–92, Jul. 1995.

* cited by examiner

*Primary Examiner*—Chi Pham
*Assistant Examiner*—Prenell Jones
(74) *Attorney, Agent, or Firm*—Baker Botts L.L.P.

(57) ABSTRACT

In one aspect, a method of using a general purpose computer 8 as an MPLS-enabled label switched router includes executing software on the general purpose computer 8 that allows it to communicate with other label switched routers using label distribution protocol. The general purpose computer 8 includes a central processor 10, a memory 12, network interface cards 30 and 32 and also typically includes local I/O such as a keyboard 22, a mouse 24 and a display device 20 for communicating with a local user.

62 Claims, 6 Drawing Sheets

MULTIPROTOCOL LABEL SWITCHING ROUTERS

RELATED APPLICATION

This application claims priority to PCT Application Ser. No. PCT/US00/06082, filed Mar. 9, 2000, which claims the benefit of U.S. Provisional Application Ser. No. 60/124,063, filed Mar. 12, 1999.

FIELD OF THE INVENTION

This invention relates generally to communications method and systems and specifically to a system and method for the implementation of multiprotocol label switching routers.

BACKGROUND OF THE INVENTION

A communication system includes a collection of components that communicate, manipulate, and process information in a variety of ways. The system may support different access technologies, such as frame relay, circuit services, and new and evolving connection-based or connectionless services, that communicate information, such as data, voice, and video. Switches in the communication system employ hardware and software to route information generated by access technologies to an intended destination. In an integrated services network, switches may route information among access technologies in a unified manner.

One helpful way to think of a network is using the layering model such as the ISO model. In the ISO model, the communication problem is divided into subpieces or layers. The data link layer, layer 2, specifies how to organize data into frames and how to transmit frames over a network. The network layer, or layer 3, specifies how addresses are assigned and how packets are forwarded from one end of the network to another.

Multiprotocol Label Switching (MPLS) is a technique for improving the performance of networks by using layer 2 switching instead of layer 3 routing, independently of the routing scheme being used. The specification for MPLS is provided by the IETF (Internet Engineering Task Force).

MPLS uses labels or tags that contain forwarding information. These labels are attached to packets by the initial router, sometimes referred to as the ingress router or simply ingress. Switches and routers that receive the packets examine the label more quickly then if they had to look up destination addresses in a routing table. In this manner, communications can travel across the network more quickly.

MPLS is not specific to any type of network. Many initial commercial implementations, however, will focus on ATM (asynchronous transfer mode) networks since a large number of these networks have already been deployed throughout the world. Therefore, a need exists to adapt current ATM equipment to be compatible with MPLS.

SUMMARY OF THE INVENTION

The present invention provides a number of ways to implement a MPLS label switched router with inexpensive equipment.

In one aspect of the present invention, Network Interface Card or NIC-based Routers can implemented using a general purpose computer and network interface cards. In the preferred embodiment, standard Linux-based PCs with ATM and Ethernet NICs are used. In the preferred embodiment, the NIC-based Routers support multiple IP over ATM links by using multiple ATM NICs. To minimize cost and complexity, these devices might not support fast ATM switching between those interfaces. Accordingly, the device would best be used on the edges of MPLS domains.

This aspect of the preferred embodiment provides a method of using a general purpose computer as an MPLS-enabled label switched router. The general purpose computer executes software that allows it to communicate with other label switched routers using label distribution protocol. The general purpose computer also includes local I/O such as a keyboard, a mouse and a display device for communicating with a local user.

In an alternate embodiment, a communication device includes a non-MPLS enabled ATM switch and an attached processor, typically a general purpose computer. This embodiment is useful to enable ATM switches that were not designed to handle MPLS to utilize MPLS. For example, a great number of ATM switches exist in current networks. It would be prohibitively expensive to simply replace all of these switches with newer models that can utilize MPLS. This embodiment of the present invention provides a solution that utilizes an attached processor, typically a general purpose computer, to update the existing ATM switch.

In one aspect, the present invention provides a system and method for the implementation of an ATM-based Multiprotocol Label Switching Router (LSR) and associated tools for monitoring the behavior of an MPLS network. In the preferred embodiment, the router is implemented in software for the Linux platform and interacts with the commercially available switches such as the Fujitsu Fetex-150 ATM Switch. The preferred embodiment tools for managing the MPLS network comprise Linux command line programs and a Java-based, graphically oriented utility program.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

The present invention claims priority to U.S. provisionally filed patent application 60/124,063. The contents of that provisional application are incorporated herein by reference.

The specification will describe the implementation and use of preferred embodiment systems and components of the present invention. The major components of the preferred system are described and their functions are explained. Variations and modifications of this system are also envisioned.

The preferred embodiment of the present invention deals with Multiprotocol Label Switching (MPLS). MPLS is a technique for improving the performance of networks by using layer 2 switching instead of layer 3 routing, independently of the routing scheme being used. One area of particular interest is the use of MPLS to improve the performance of running Internet Protocol (IP) over Asynchronous Transfer Mode (ATM) networks that use existing ATM switches, that is ATM switches that are not able to otherwise utilize MPLS.

In IP networks, the forwarding of packets requires a considerable amount of processing by a router, including a "longest match" algorithm that must be performed to determine each packet's destination address match an address prefix in the routing table. Unfortunately, the IP header contains more information than is necessary for each router to make local decisions about which of its output ports to send a packet to, resulting in unnecessary processing. MPLS can reduce the amount of processing by assigning shorter, locally-known labels to IP streams. Once an IP stream has been labeled, only the labels need to be processed in order to forward packets to the correct destination.

When MPLS is used for IP over ATM networks, the labels are simply the VPI.VCI (virtual path identifier.virtual circuit identifier) combination in the ATM cell header. Thus, labeling an IP packet consists of putting the packet into ATM cells using AAL5 and setting the VPI and VCI fields in the cell headers to be equal to the label values—i.e., sending the packets on the specified virtual circuit (VC). Then, a standard ATM switch can be used to swap incoming labels on an interface to outgoing labels on another interface. Since the label swapping is performed with dedicated hardware, its performance will be excellent.

In order for labeling to work, adjacent routers must agree on which labels to use for each IP stream. In the preferred embodiment of the present invention, the Label Distribution Protocol (LDP) is used to carry out this negotiation.

In one aspect, the present invention relates to a communications device, such as a switch or a router. The communication device can be used with other similar devices to create a network. In one particular embodiment, the network is based on Internet Protocol (IP). Messages transferred throughout the network can be data, voice, video or other.

The following discussion will describe two types of Label Switched Routers (LSRs) that can be used to implement embodiments of this invention. These two categories can be referred to as NIC-based Routers and Switch-based Routers. As will be clear, many variations and combinations of the two can be implemented. NIC-based Routers will be described first.

In one aspect of the present invention, Network Interface Card or NIC-based Routers can implemented using a general purpose computer and network interface cards. In the preferred embodiment, standard Linux-based PCs with ATM and Ethernet NICs are used. In the preferred embodiment, the NIC-based Routers support multiple IP over ATM links by using multiple ATM NICs. To minimize cost and complexity, these devices might not support fast ATM switching between those interfaces. Accordingly, the device would best be used on the edges of MPLS domains.

One aspect of the preferred embodiment provides a method of using a general purpose computer as an MPLS-enabled label switched router. The general purpose computer executes software that allows it to communicate with other label switched routers using label distribution protocol. The general purpose computer also includes local I/O such as a keyboard, a mouse and a display device for communicating with a local user.

Figure 1A:
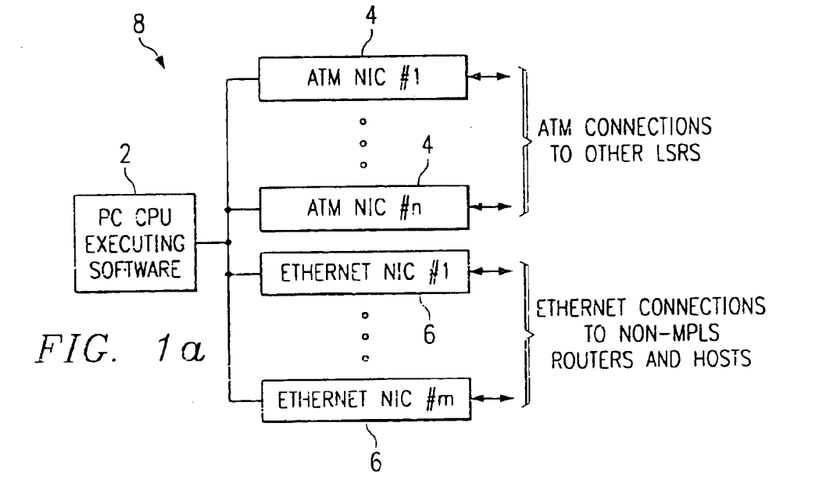
FIGS. 1a–1b are block diagrams of a NIC-based router.

FIG. 1a provides a simplified illustration of a NIC-based router 8. In this example, a label switched router (LSR) is implemented using a general purpose computer system, such as a Linux personal computer (PC) with multiple network interface cards (NICs) 4, 6. The processing portion of the system is shown by the box labeled with reference numeral 2. In the example of FIG. 1a, each ATM NIC 4 would have point-to-point connections to its neighboring LSRs. On those links, permanent virtual connections (PVCs) would be used as the default IP path between LSRs. Classic IP over ATM would be used to transmit data. The Ethernet NICs 6 would be connected to IP sub-nets outside the MPLS domain. Finally, each of the LSRs' NICs will have a unique IP address.

Figure 1B:
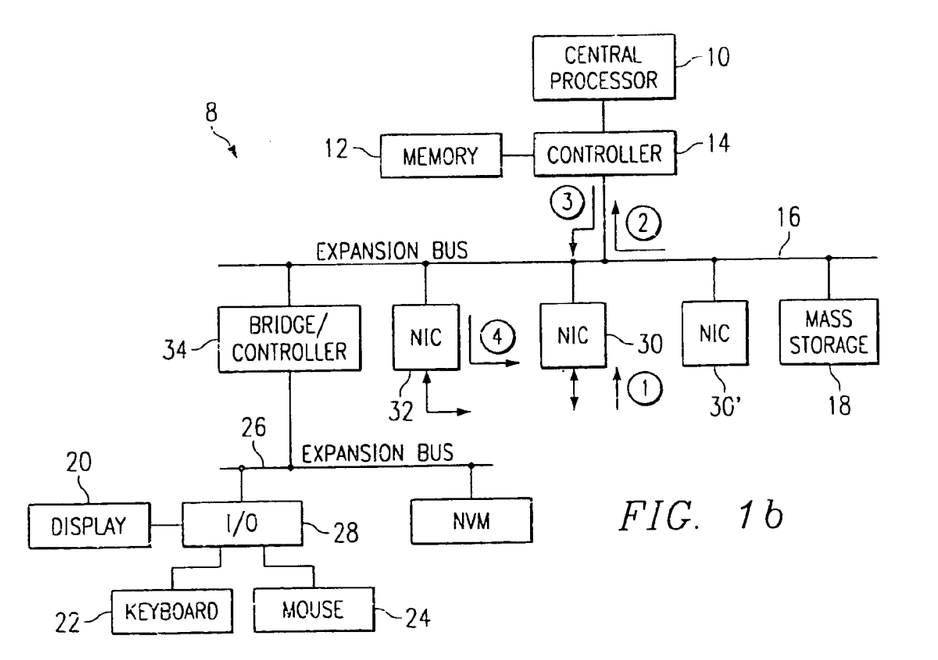

FIG. 1b illustrates an example of a general purpose computer 8 that includes at least one network interface card 30. In this context, a general purpose computer is any computer that can be used for multiple functions. This computer typically has a local user input/output (e.g., keyboard and display). Examples are desktop computers (e.g., "Wintel" PCs), portable computers, and workstations.

As shown in the figure, the general purpose computer 8 includes at least one central processor 10. Either single processor and multiprocessor systems are envisioned for this application. The central processor could be an x86 processor (e.g., Pentium, Pentium II, Pentium III, Merced, AMD or Cyrix equivalent), a PowerPC processor, a Sparc, an Alpha or others.

The processor 10 is coupled to a memory 12, typically a dynamic random access memory. The memory stores program instructions to be executed by the central processor 10. One such program is the operating system. The present invention can utilize a number of operating systems including Linux, Windows (NT, 95, 98, ME), DOS, MacDOS, OS/2, Unix, Solaris and others. The memory 12 will also store application programs for execution by the central processor.

A controller 14 is illustrated between central processor 10 and memory 12. This controller 14 couples the processor 10 to an expansion bus 16 (and can therefore sometimes be referred to as a bridge circuit). Expansion bus 16 may, for example, comprise a PCI bus. The expansion bus 16 includes a number of expansion slots into which expansion cards may be inserted. For example, a memory card(s) 18, e.g., mass storage, could be used. Of particular importance in this embodiment of the present invention, the expansion cards will include at least one network interface card (NIC) 30. Where the device 8 serves as label switched router in an ATM system, at least one of the cards will be an ATM NIC. If the router is an end router, another of the cards will be of a different type, e.g., an Ethernet card.

The general purpose computer 8 also includes user input/output devices such as a display 20, a keyboard 22 and a mouse 24, each of which is coupled to an input/output controller 28. In the illustrated embodiment, these devices are coupled through a second expansion bus 26, such as an ISA or EISA bus. Expansion bus 26 is coupled to expansion bus 16 by a bridge and/or controller circuit 34. The present invention, however, is not limited to computers with this architecture.

In the preferred embodiment, the general purpose computer 8 can serve as an MPLS-enabled switch. For example, assume that the NIC 30 is an ATM NIC coupled to an upstream label switching router or LSR (not shown). Also assume for this example that NIC 32 is an ATM NIC coupled to a downstream router (not shown). The goal is to switch specific traffic from the upstream router to the downstream router through the general purpose computer 8.

Referring to FIG. 1, ATM packets are received at NIC 30. These packets travel from NIC along expansion bus 16 to controller/bridge circuit 14 where they can be processed by the central processor 10. After processing the packets, the traffic is routed back to NIC 32 along the expansion bus 16. The ATM packets can then be forwarded to the downstream LSR.

In alternate embodiments, one of the NICs 30 or 32 can be a non-ATM card. For example, the card could be an Ethernet card. In these examples, the communication device could serve as an ingress or egress LSR. Alternatively, the communication device could initiate the packet stream at processor 10.

An example where the communication device initiates the packet stream could be a personal computer used by a person who works from his or her home (e.g., a telecommuter). In this case, an MPLS table entry could be created for the person's home to the company's network (e.g., a corporate intranet or virtual private network). In this manner, communications from the home office could be speeded up by utilizing the benefits of MPLS.

As an alternate embodiment, MPLS connections could be brought up and taken down as needed when connecting to an IP-based network, such as the Internet. While this technique may be inefficient if connections are needed for only short periods of time, it could be beneficial if the user connects to the same destination often and/or for long periods of time.

Figure 2A:
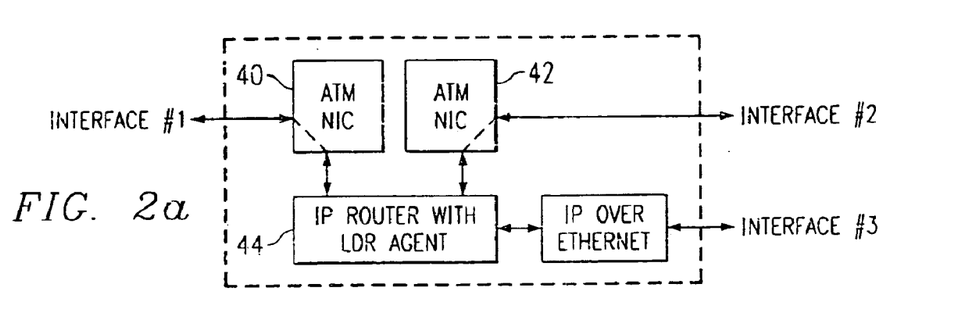
FIGS. 2a–2c are diagrams of a router showing input and output data paths.
Figure 2B:
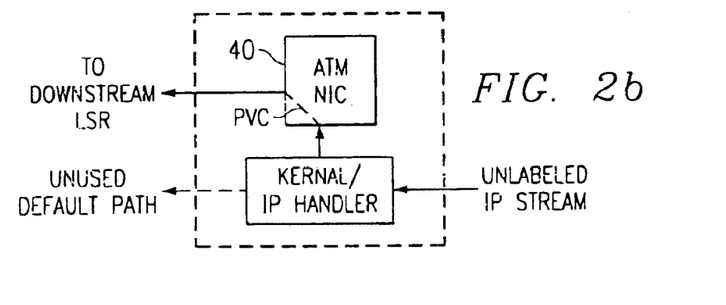
Figure 2C:
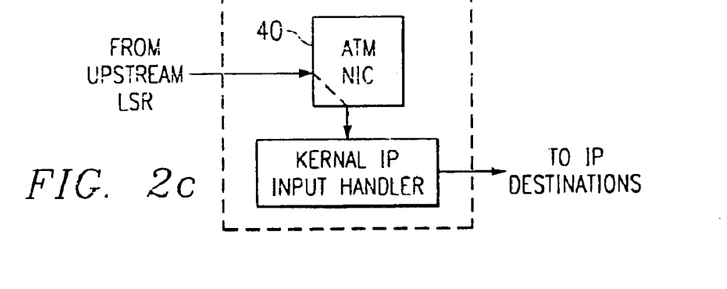

As discussed above, there are three types of connections that the communications device 8 should be able to make, namely, ingress, egress and core. An ingress connection takes a non-MPLS packet stream, assigns it an MPLS compliant label and forwards it within the MPLS domain. An egress connection receives an MPLS packet and forwards to a node outside the MPLS domain. Finally, a core connection (or a forwarding connection) forwards an MPLS packet within the MPLS domain. FIGS. 2a–2c illustrate the connections for each of these cases.

FIG. 2a illustrates a NIC-based router 8 from a logical view of a core router. This router 8 includes ATM NIC drivers 40 and 42 (e.g., corresponding to NICs 30 and 32) and IP router 44. The IP router 44 is software running on processor 10 and includes an LDR agent. The illustrated IP router 44 is also coupled to Ethernet driver 46. The router 8 includes three network interfaces: two that are ATM-based, and one that is Ethernet-based.

Core connections, or label swapping, occur when a labeled stream of packets needs to be send to the downstream router and a label for the stream has been determined. The router sending labeled packets to the router under consideration is called the upstream LSR. The router in which the packets are being sent to is called the downstream LSR.

1. Using label distribution protocol (LDP) with both its upstream and downstream LSRs, an LSR determines that it is a core router for a given IP stream and determines which labels to use for the stream, both input and output
2. The LSR opens a permanent virtual connection (PVC) on the NIC connected to the upstream LSR using a VPI.VCI equal to the input label from step 1.
3. The LSR opens a PVC on the NIC connected to the downstream LSR using a VPI.VCI equal to the output label from step 1.
4. The LSR instructs the kernel's ATM input handler to listen for incoming packets on the PVC established with the upstream LSR and immediately send those packets to the PVC connected to the downstream LSR via the kernel's ATM output handler.
5. When the LSR no longer needs to label the IP stream, it closes the connection between the PVC created in steps 2 and 3.

Ingress connections allow unlabeled IP streams to be labeled and sent to the downstream router. Such a connection is shown in FIG. 2b. Unlabeled streams would reach the routing agent in the processor either from the Ethernet or Point-to-Point IP over ATM links. To label the packets, the NIC-based LSR follows the procedure delineated by the following steps.

1. Using LDP, an LSR determines that it is an Ingress router for a given IP stream prefix nd determines which label to use for the stream.
2. The LSR opens an ATM PVC connection on the ATM NIC connected to the downstream LSR with VPI.VCI equal to the label from step 1.
3. The LSR instructs the operating system kernel to send IP packets with a destination that matches the IP prefix specified in step 1 to the PVC created in step 2.
4. When the LSR no longer needs to label the IP stream, it closes the PVC connection.

Egress connections allow incoming labeled packets to be sent to the next destination, either host or router, that is not part of the MPLS domain. A diagram showing an egress connection is shown in FIG. 2c. The process for initiating egress connections is shown below:

1. Using LDP, an LSR determines that it is an Egress router for a given IP stream and determines which label to use for the stream.
2. The LSR opens an ATM PVC connection on the ATM NIC connected to the upstream LSR with VPI.VCI equal to the label from step 1.
3. The LSR instructs the operating system kernel to receive ATM AAL5 packets on the PVC and send those packets to the kernel's IP input handler.
4. When the LSR no longer needs to label the IP stream it closes PVC connection.

In the preferred embodiment, processor 10 is programmed to execute software that enables the communications device 8 to implement multiprotocol label switching. The algorithm to perform MPLS determines that the memory 12 stores an outgoing packet. A VPI.VCI label is assigned to the outgoing packet using label distribution protocol. The packet can then be forwarded to ATM network interface card 32 (or 30) to be output with the VPI.VCI label. For an incoming packet, the packet is received at ATM NIC 30 (or 32). This packet would be forwarded to an IP handler, which comprises software instructions operating on the processor 10.

As noted above, the communication device 8 can be configured to serve as an endpoint in an MPLS system. For example, the device 8 might be an endpoint in some paths and a core router in others. When acting as an edge router, software running on processor 10 will open the endpoint of an ATM permanent virtual circuit (PVC) on the ATM NIC 30 (or 32) coupled to a downstream label switch router (not shown). The characteristics of the endpoint are typically specified by label distribution protocol. This PVC connection will be closed when it is not longer needed.

In some embodiments, software will instruct an operating system kernel executing on the central processor 10 to send IP packets on the destination virtual circuit that corresponds to an MPLS label that is associated with a class of IP packets. This software will remove the VPI.VCI label from a packet when the packet needs to be forwarded to a non-MPLS downstream router or host.

When acting as an ingress label switched router (LSR), the communication device 8 will receive packets from other devices on the network. If the device 8 determines that an IP stream can be utilize MPLS, it will request a VPI.VCI label from a downstream LSR. This request is typically made using label distribution protocol. The LSR will then associate the IP stream with the VPI.VCI label received from the downstream LSR. When using the ATM protocol, an ATM PVC connection is opened on one of the ATM NICs 30 or 32 connected to the downstream LSR. This PVC connection will be associated with the VPI.VCI label received from the downstream LSR. The device will then send IP packets with a destination that matches the IP prefix of the received IP stream to the PVC connection. The PVC connection can be closed when it is no longer needed.

When acting as an egress LSR, the device 8 will receive a request for a VPI.VCI label from a upstream LSR. Again, the request is preferably made using label distribution protocol. The device will communicate a VPI.VCI label to the upstream LSR, e.g., using label distribution protocol, and open an endpoint of an ATM PVC connection on an ATM NIC 30 (or 32) connected from the upstream LSR. Once it is determined that the VPI.VCI label corresponds to an IP stream, the operating system of device 8 will to send packets received at the PVC connection at the ATM NIC to an IP input handler, also running on processor 10. The processor 10 will then cause the packets to be forwarded to a downstream router using the IP address.

Figure 3:
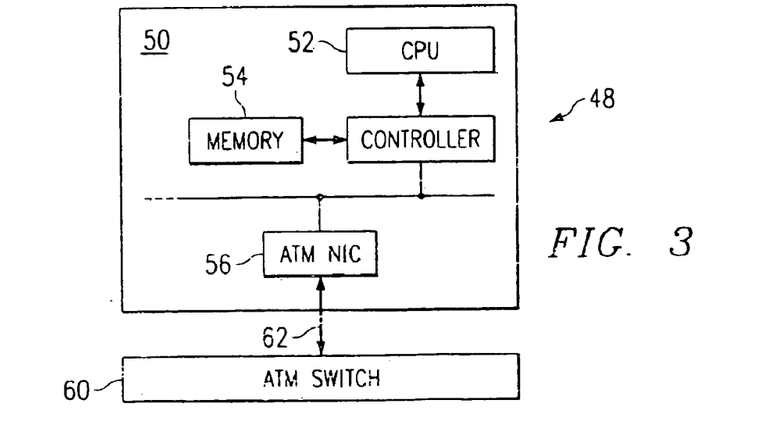
FIG. 3 is a block diagram of a switch-based router.

In a second embodiment, an example of which is illustrated in FIG. 3, a communication device 48 includes a non-MPLS enabled ATM switch 60 and a general purpose computer 50. This embodiment is useful to enable ATM switches that were not designed to handle MPLS to utilize MPLS. For example, a great number of ATM switches exist in current networks. It would be prohibitively expensive to simply replace all of these switches with newer models that can utilize MPLS. This embodiment of the present invention provides a solution that utilizes an attached processor 50, typically a general purpose computer, to update the existing ATM switch 60.

As shown in FIG. 3, attached processor 50 can include the same basic architecture as the general purpose computer 8 shown in FIG. 1. As shown, computer 50 can include one or more microprocessors or CPUs 52, a memory 54 and an ATM NIC 56. While not shown, the computer 50 can also include local user I/O apparatus such as a display, keyboard, mouse, speakers, and others.

The attached processor 50 can execute software to communicate with an associated non-MPLS enabled ATM 60 switch through ATM NIC 56. This communication is preferably performed using third party call control (TPCC), sometimes referred to as proxy signaling. The general purpose computer 50 executes software that enables the non-MPLS enabled ATM switch 60 to utilize MPLS.

In the preferred embodiment, the attached processor 50 and the ATM switch 60 are located in separate housings, electrically coupled to one another through a cable 62. Separate housings, however, are not required. The attached processor 50 could be a separate board stored in the ATM switch 60 housing. In an alternate embodiment, the attached processor circuitry could be located on the same board at the ATM switch controller.

In the preferred embodiment, the switch-based router 48 is implemented by attaching a personal computing running a Linux operating system (or simply a "Linux PC") 50 to one interface of an ATM switch 60. The Linux PC 50 performs all routing functions while all switched connections bypass the Linux PC 50. Switch-based routers can have as interfaces many as interfaces on the switch, minus one, for the connection between the switch 60 and the attached processor 50.

Figure 4A:
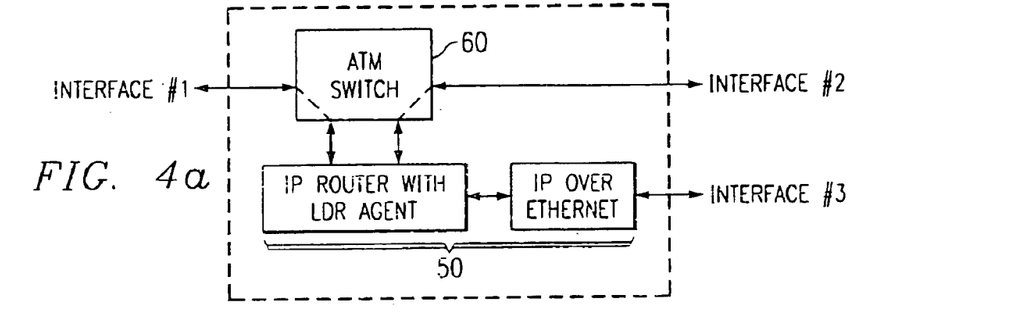
FIGS. 4a–4d are diagrams of a router showing input and output data paths.

Although switch-based routers would be typically used in the core of the MPLS network, they can also function as edge routers by using an Ethernet NIC (not shown in FIG. 3, see FIG. 4) in the general purpose computer 50.

FIG. 4a illustrates another view of the switched based router 48. In this example, the switch-based router 48 has three interfaces. The two interfaces labeled Interface #1 and Interface #2 use point-to-point IP over ATM links and could utilize MPLS. The connections through the ATM switch 60 from these interfaces to the attached processor 50 are permanent virtual circuits (PVCs). The interface labeled Interface #3 uses standard IP over Ethernet and would be outside of the MPLS domain. Each of the LSR's interfaces will have a unique IP address.

Figure 4B:
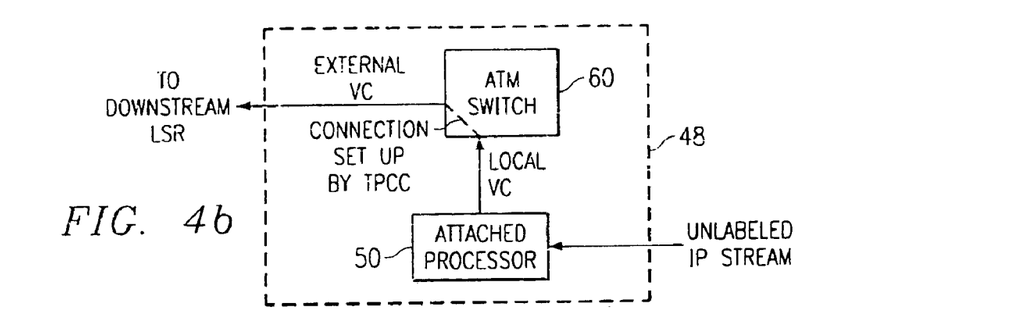
Figure 4C:
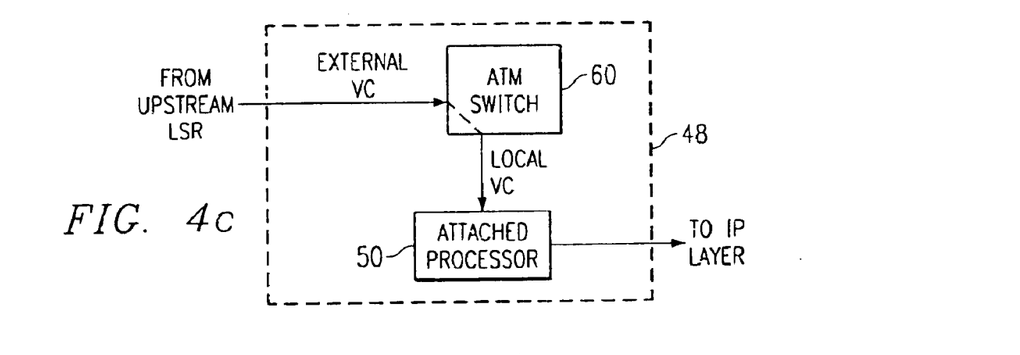
Figure 4D:
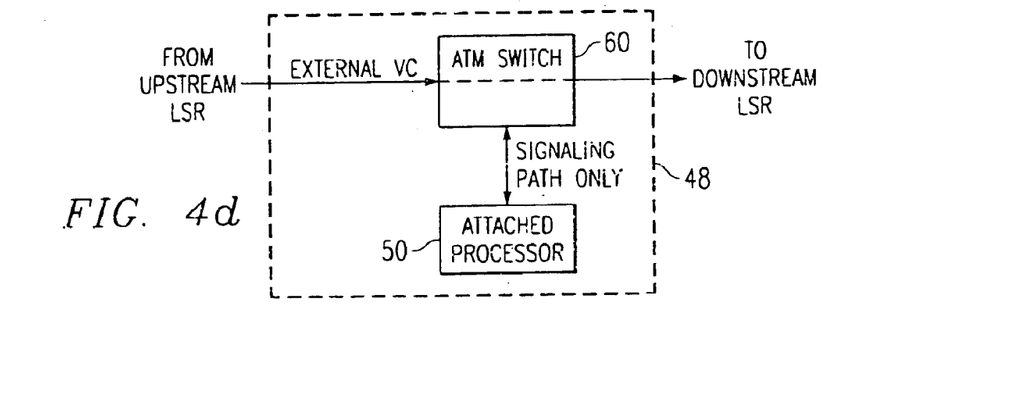

As with the NIC-based router, there are three types of connections that the attached processor must be able to make in conjunction with its ATM switch: ingress, egress and core.

Ingress connections allow unlabeled IP streams to be labeled and sent to the downstream router. FIG. 4b shows an ingress connection. Unlabeled streams would reach the routing agent in the attached processor either from the Ethernet or Point-to-Point IP over ATM links. To label the packets, the attached processor follows the procedure shown below:

1. Using LDP, an LSR 48 determines that it is an Ingress router for a given IP stream and determines which label to use for the stream.
2. The attached processor 50 finds an unused local label to use for the connection between the attached processor 50 and the switch 60.
3. The attached processor 50 sends a Q.2931 setup message to the switch 60 to initiate a connection from its own interface to the interface that is connected to the downstream router. The setup message will contain the local VPI.VCI value in the connection ID information element, the attached processor's ATM address as the calling party, and the downstream LSR's ATM address as the called party. This message initiates a "local" hop of the VC between the attached processor and the switch.
4. If the switch 60 has been setup with the attached processor's interface to be a proxy signaling agent (PSA), which is a standardized form of Third-party Call Control (TPCC), then the switch 60 will send a Q.2931 setup message back to the attached processor 50 for the terminating end of the connection.
5. The attached processor 50 will respond with a Q.2931 call proceeding message that includes a connection identification information element that has a VPI.VCI field equal to the label of the IP stream under consideration—i.e., the value from step 1. This creates the "external" hop of the VC between the switch 60 and the downstream LSR.
6. The switch 60 also connects the local hop of the VC to the external hop of the VC so that data sent to the local VC will be switched to the external VC.
7. Then, the attached processor 50 sends all of the IP stream's labeled packets to its end of the VC and the switch 60 will send those packets to the external hop.
8. When the LSR no longer needs to label the IP stream, it will close the connection between the attached processor and the downstream router by sending a Q.2931 release message to the switch.

Egress connections allow incoming labeled packets to be sent to the next destination, either host or router, that is not part of the MPLS domain. Such a connection is shown in FIG. 4c. The process for initiating Egress connections is shown below:

1. Using LDP, an LSR determines that it is an Egress router for a given IP stream and determines which label to use for the stream.
2. The attached processor finds an unused local label to use for the connection between the attached processor and the switch.
3. The attached processor sends a Q.2931 setup message to the switch to initiate a connection from its own interface to the interface that is connected to the upstream LSR. The setup message will contain the local VPI.VCI value in the connection identification information element, the attached processor's ATM address as the calling party, and the upstream LSR's ATM address as the called party. This message creates a "local" hop of the VC between the attached processor and the switch.
4. If the switch has been setup with the attached processor's interface to be a proxy signaling agent, a standardized form of third-party call control (TPCC), then the switch will send a Q.2931 setup message back to the attached processor for the terminating end of the connection.
5. The attached processor will respond with a Q.2931 call proceeding message that includes a connection ID information element with the VPI.VCI equal the label of the IP stream under consideration—i.e., the value from step 1. This creates the "external" hop of the VC between the switch and the downstream LSR.
6. The switch also connects the local hop to the external hop so that incoming data on the external hop will be switched to the local hop and sent to the attached processor.
7. The attached processor listens for incoming packets on its end of the VC and sends all of the incoming packets to the IP layer of the protocol stack.
8. When the LSR no longer needs to label the IP stream, it will close the connection between the attached processor and the downstream router by sending a Q.2931 release message to the switch.

Core connections occur when a labeled stream of packets needs to be sent to the downstream router and a label for the stream has been determined. An illustration of a core connection is shown in FIG. 4d. The router sending label packets the router under consideration is called the upstream LSR. The router in which packets are being sent to is called the downstream LSR.

1. Using LDP with both its upstream and downstream LSRs, an LSR determines that it is a core router for a given IP stream and determines which labels to use for the stream, both input and output.
2. The attached processor sends a Q.2931 setup message to the switch to make a connection from the interface connected to the upstream LSR to the interface that is connected to the downstream LSR The setup message will contain the label from the upstream LSR as the VPI.VCI value in the connection ID information element, the upstream LSR's ATM address as the calling party, and the downstream LSR's ATM address as the called party. This message creates a VC hop between the upstream LSR and the switch.
3. If the switch has been setup with the attached processor's interface to be a proxy signaling agent, a standardized form of third-party call control (TPCC), then the switch will send a Q.2931 setup message back to the attached processor for the terminating end of the connection.
4. The attached processor will respond with a Q.2931 call proceeding message that includes a connection ID information element with the VPI.VCI equal the label for the IP stream given by the downstream LSR. This will complete the connection between the upstream and downstream LSRS.
5. When the LSR no longer needs to label the IP stream, it will close the connection between the upstream and downstream LSRs by sending a Q.2931 release message to the switch.

In the preferred embodiment, device 48 will be used as a core router (since ATM switch 60 can switch and forward packets very quickly). In this case, the device 48 will receive a request from an upstream LSR that the upstream LSR wants to send a given IP stream. In turn, device 48 will request that a downstream LSR provide a label for the given IP stream. Both of these requests are typically made using label distribution protocol. In response to the requests, the device will receive an outgoing VPI.VCI label from the downstream LSR and send an incoming VPI.VCI label to the upstream LSR. Using these labels, a switched virtual circuit connection can be created from an ATM switch interface connected to the upstream using the incoming label to an ATM switch interface connected to the downstream using the outgoing label. In the preferred embodiment, the switched virtual circuit connection is signaled using TPCC.

As discussed above, the device 50 can also be used as a non-core router. In this implementation, a request for a VPI.VCI label is received from a upstream LSR. The processor 52 determines a VPI.VCI label for the given IP stream and communicates that label to the upstream LSR, e.g., using label distribution protocol. The processor 52 also assigns a local label to be used for a connection between the attached processor 50 and the ATM switch 60. Using TPCC, the attached processor will create a switched virtual circuit connection from the attached processor using the local label to the external interface using the external label. Packets received at the switched virtual circuit connection at an ATM NIC of the attached processor can be processed by an IP input handler routine running on processor 52. The packets can then be forwarded to a downstream router based upon the IP address. For example, the packets can be forwarded to a non-MPLS link such as an Ethernet link, a PPP dial modem connection, or a token ring, DEC net, apple talk, or ATM link.

Both the NIC-based router 8 of FIG. 1 and the switched based router 48 of FIG. 3 can use similar software operating on the general purpose computer. For clarity, edge and core functionality can be partitioned. These system components for a label switched router 8 or 48 will now be described with reference to FIGS. 5 and 6.

Figure 5:
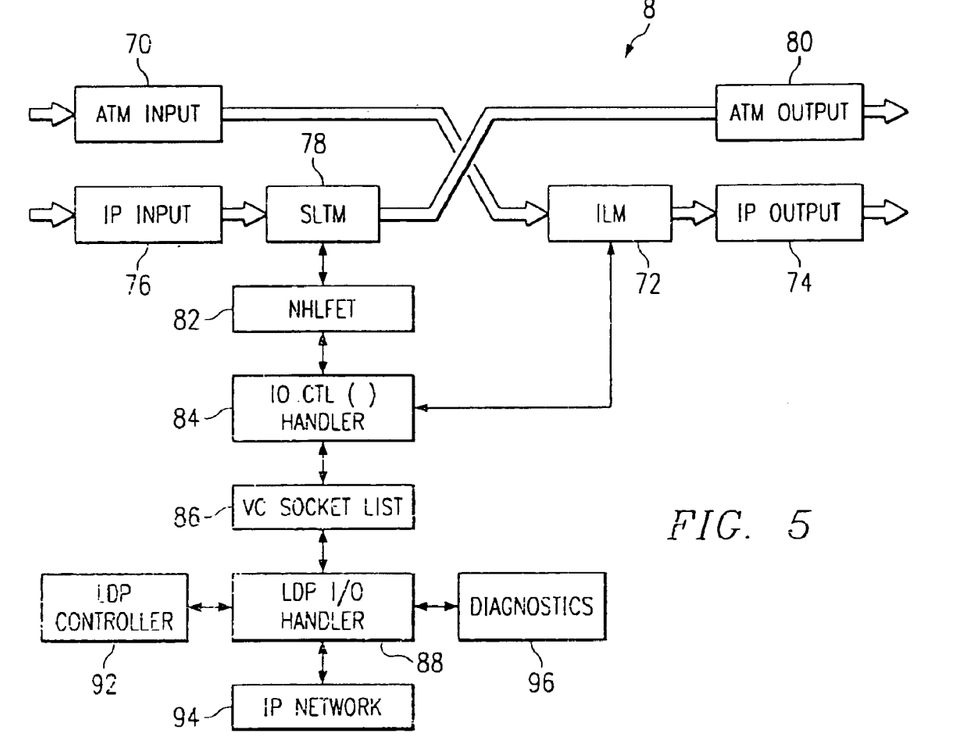
FIG. 5 is a diagram showing the functional relationships of modules in an edge router.
Figure 6:
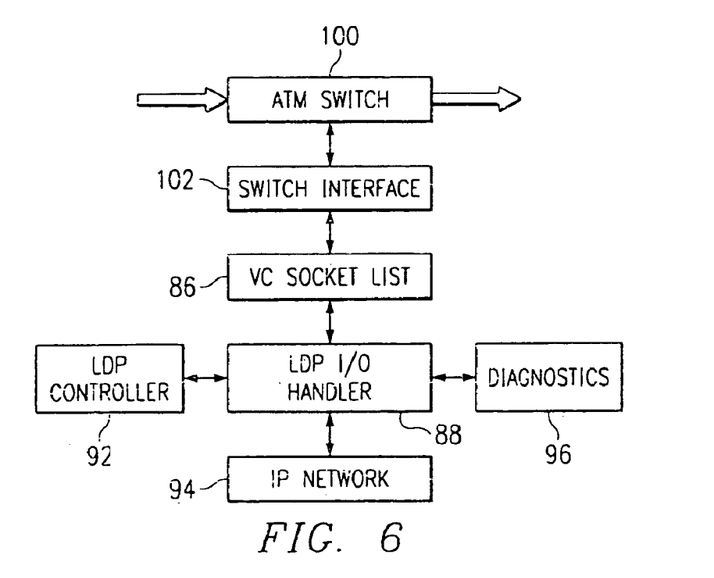
FIG. 6 is a diagram showing the functional relationships of modules in a core router.

FIG. 5 shows the major logical components of routers for edge forwarding and FIG. 6 shows the major logical components for core forwarding. These block diagrams assume that a NIC-based router 8 is being used as the edge router and a switch-based router 48 is being used as the core router. It should be understood, however, that either type of router can be used for either function.

In FIGS. 5 and 6, data is indicated by double lines and control signals are indicated by single lines.

Referring first to FIG. 5, an edge router would have two functions, which can be referred to as ingress and egress. In the egress case, an MPLS labeled packet is received at ATM input 70. In the preferred embodiment, the packet is labeled with a VPI.VCI number that is understood by the ATM switch. ATM input 70 transfers the data to Incoming Label Mapper (ILM) 72 which determines the IP address of the downstream of the packet. ILM 72 then forwards the packet to IP output 74, which can in turn forward it to its next destination.

In the ingress case, an IP packet is received at IP input 76. Stream to Label Mapper (SLTM) 78 assigns an MPLS label to the packet and forwards it to ATM output 80 from where it can travel to the next ATM switch (not shown).

When the NIC-based router 8 serves as a core router, data is transferred directly from ATM input 70 to ATM output 80. This case is not illustrated in the figure.

Figure 9:
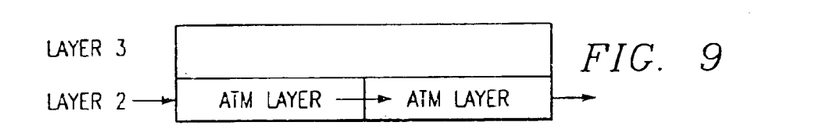

FIG. 6 illustrates a core router that can be implemented using a switch based router 48 (such as the one illustrated in FIG. 3). In the core router, data flows through the ATM switch module 100. When an LSR acts as a core node in the MPLS domain, packets are switched at layer 2, as shown in FIG. 9. This process is what gives MPLS its high performance.

The remainder of the control components of FIGS. 5 and 6 will now be described.

Stream to Label Mapper (STLM) 80 is designed to listen for all incoming IP packets on all IP-bound adapters. When a packet arrives, the Next Hop Label Forwarding Entry (NHLFE) table 82 should be consulted using the incoming IP packet's address as the search key. The table lookup function will return an interface number and a label, or an error indicator. If there is an error indicator, the packet should be routed by conventional means. If a valid label is returned, the entire IP packet should be sent to the ATM driver 80 using the specified interface number and label. The interface number specifies which ATM NIC (see FIG. 1) to use and the label specifies which VPI.VCI number to use—i.e., which virtual circuit (VC) to use.

In the preferred embodiment, the STML 80 was implemented by modifying the clip_xmit( ) function in the atmarp.c file in the Linux ATM kernel. With the assumption that all MPLS routers will use point-to-point IP over ATM connections to send packets to their peer MPLS routers, this is a suitable location to inspect IP headers for possible labeling, since the clip_xmit( ) function is used to transmit all IP packets over ATM. The clip_xmit( ) function uses a "struct atm_vcc" object to specify the characteristics of the ATM virtual connection (VC) that is used by the point-to-point IP link. By modifying the atm_vcc object in clip_xxmit( ) just prior to transmitting the packet, the packet can be sent to a different VC then the default point-to-point link—i.e., it can be labeled and sent to any VC that we choose. A query to the NHLFET 82 is used to determine which atm_vcc to use.

Figure 7:
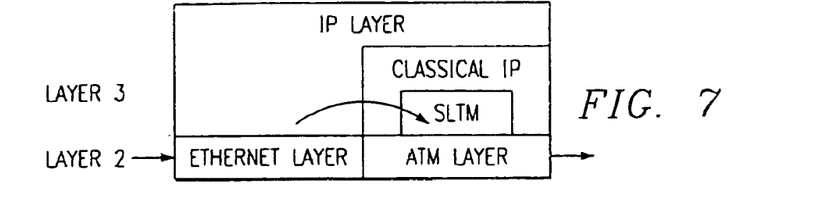
FIGS. 7–9 show how aspects of the inventions fit into layers of the OSI model.

FIG. 7 illustrates how the STLM 78 fits into the protocol stack.

The module referred to as the Next Hop Label Forwarding Entry (NHLFE) Table 82 will store the list of associations between streams and labels. The labels are ITF.VPI.VCIs tuples, where ITF is a unique number that identifies to which ATM interface the packet is to be sent. The module 82 will provide access to the table via a well-known interface. The NHLFE table 82 will preferably hide the details of the underlying data structure from the users of the table and provide fast and reliable lookups.

In the preferred embodiment, The NHLFE table 82 responds to queries for information from the STLM 78 in edge routers via the NHLFET_Find( ) command. The command takes the IP destination address and returns a pointer to an atm_vcc object if an entry for the IP address is found in the table. Otherwise it returns NULL, and the STLM 78 SP use the default atm_vcc.

In the preferred embodiment, the NHLFET 82 was implemented as a linear probing hash table with 256 entries. This table size and lookup scheme was adequate for any routing scenario in a lab environment, but would need to be enlarged for real systems. Tables sizes for realistic settings would be one to two orders of magnitude higher. This scheme provides excellent performance for both successful and unsuccessful lookups in the table.

In the preferred embodiment, entries in the NHLFET 82 are added or deleted by using ioctl( ) commands on a PVC-type socket. To add a NHLFET entry, a PVC-type socket is created (in user space) with the desired interface number and VPI.VCI value. An ioctl(socket, NHLFET_ADD, prefix) command is performed on that socket. This command adds the socket's atm_vcc and prefix to the table. The socket should be kept open while the label is still being used. To discarded the mapping, ioctl(socket, NHLFET_DEL, 0) should be called and the socket closed. The entire table can be reset with a call to ioctl(socket, NHLFET_INIT,0). The discussion below relating to the ioctl( ) handler 84 provides for more information.

Incoming Label Mapper (ILM) 72 is essentially the reverse process of the Stream to Label Mapper 78. The ILM 72 listens for incoming packets on all of the incoming virtual circuits (VCs) that are set up by the LDP Agent. When an incoming AAL5 packet arrives on an MPLS VC, it should be sent to the IP layer for further processing. This is accomplished by the LDP Agent opening a PVC (permanent virtual circuit) socket on the desired VC and instructing the kernel to change the push handler function from the atm_push_raw( ) function to the atm_push_ip( ) function. With the change in push functions, all incoming AAL5 packets on the VC associated with the socket will be sent to the IP layer instead of to the application that opened the PVC socket.

The ioctl(socket, ILM_ADD) handler 84 is used to modify the socket's push function. Since the socket should be kept open for the mapping function to operate, the socket descriptor is stored in the VC Socket List. To remove the mapping, the socket can simply be closed.

Figure 8:
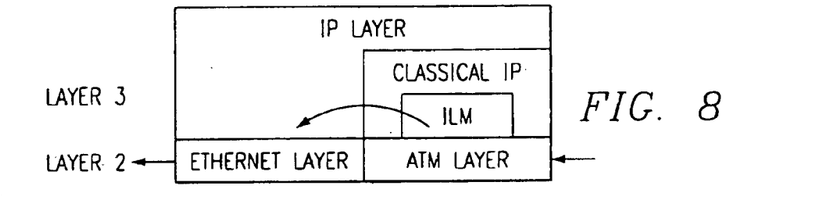

A diagram of the ILM's position in the protocol stack is shown in FIG. 8.

The ioctl( ) handler 84 provides a mechanism for user programs to communicate with the kernel. This is performed by defining new values for ioctl( ) commands for specific types of sockets and implementing a handler in the kernel for each new command value.

In the preferred embodiment user program, the ioctl( ) function has the following form:

int ioctl(int socket_descriptor, int command, long data)

The socket descriptor tells the kernel which socket to modify and which ioctl( ) handler to use, based on the type of socket passed to ioctl( ). The command parameter identifies which command to call within the ioctl( ) handler. The data parameter provides a mechanism for passing values to the kernel, and the return value allows the kernel to pass a value back to the user program. Within the kernel, an ioctl( ) handler for each socket type must be implemented. In these ioctl( ) handlers, a switch case statement is added for each new command value in order to carry out the command.

In the preferred embodiment, the NHLFET 82 and IML 72 access functions were implemented with this mechanism. The include file, /usr/include/linux/mpls.h, specifies the values for the new commands. These commands only apply to ATMPVC type sockets. The following commands are implemented:

- ☐ NHLFET_INIT: This command initializes the NHLFET table 82.
- ☐ NHLFET_ADD: This command adds a table entry for a socket and prefix. The socket should be kept open.
- ☐ NHLFET_MASK: This command sets the mask for an entry based on its socket.
- ☐ NHLFET_DEL: This command deletes the entry for a socket.
- ☐ ILM_ADD: This command changes the push function for a PVC socket to atm_push_ip( ).

The VC socket list module 86 maintains the sockets for ingress and egress label mappings. In edge routers, this includes the STLM sockets and the ELM sockets. For the preferred embodiment, a socket is also maintained for each ATM switch connection.

Since the interface to the switch uses TPCC to setup up and tear down VCs, the LDP agent must be able to specify the VPI.VCI values to use. The switch must be configured to have the proxy signaling interface to specify these values. Furthermore, the Linux kernel and Q.2931 signaling stack should be modified in order for the LDP application to specify the VPI.VCI values for incoming and outgoing calls, and to allow for calls with VPIs not equal to zero.

The LDP controller module 92 is the central control center for the LSR. It is responsible for interacting with other LSRs via Label Distribution Protocol (LDP), populating and maintaining the VC Socket List 86, and responding to changes in the IP routing table. In some embodiments, the LDP controller 92 can be written to be platform independent.

The LDP I/O handler module 88 is responsible for handling asynchronous input and output for the LDP agent. Each event handler (see below for examples) will register with the I/O handler 88. The I/O handler will "wake up" an event handler when data is ready for that event handler or when a timeout occurs. This strategy allows the LDP agent to be a single Unix process while still providing asynchronous I/O.

The IP network module 94 includes IP network connections that will be used by the LDP network interface to communicate between LDP controllers. In the preferred embodiment, this IP connection is implemented as a point-to-point ATM PVC between adjacent LSRs.

The diagnostics module 96 provides diagnostic capabilities to the system. For example, it could allow a user to display the contents of the Label Information Base (LIB) and to manually control the switch interface, the LIB, and the LDP controller.

Figure 10:
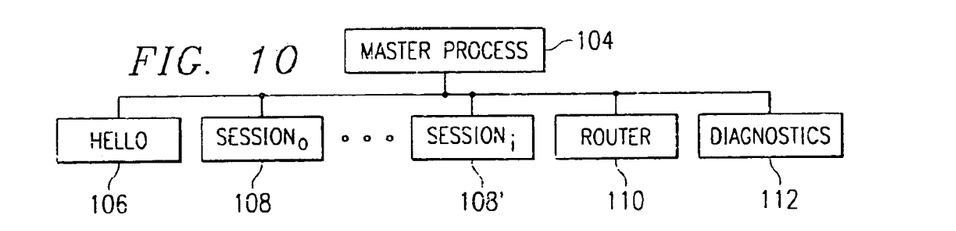
FIG. 10 shows the relationships of processes in a preferred embodiment implementation.

The next paragraphs discuss the individual event handlers within the LDP controller module 92. FIG. 10 illustrates the relationship between the even handlers. Referring to FIG. 10, the master process 104 is responsible for system initialization, error handling, and termination.

The Hello event handler 106 will be responsible for periodically sending UDP broadcast messages to the "all router" address. The process will listen for incoming hello requests and will match them with entries in an adjacency list. If the hello message is for a new peer, then a session process 108 will be initiated. Periodically, the Hello event handler 106 will check for the lack of hello messages for adjacent peers and terminate their session handlers SP 108 if necessary. When the Hello event handler terminates, it will stop all of the session event handler SP 108 that it created.

Each session event handler 108 will handle communication with one adjacent peer. It will perform the initialization with the peer and then wait for and process messages from the peer. It should be able to parse the incoming messages, execute commands, and send messages to its peers.

The routing protocol interface event handler 10 will check for changes in the IP routing table by waiting for changes in the systems routing table. In one embodiment, for example, this process is performed by polling. When a change occurs, the event handler 110 will determine which label advertisements need to be made, and will inform session event handlers 108 to send those advertisements to its peers.

The diagnostic event handler 112 is responsible for responding to diagnostic queries.

The following paragraphs will describe the basic operation of the LDP agent.
1) Read the configuration file.
2) Send hello messages out each interface listed in the configuration file.
3) Upon receiving a hello message, set up an LDP session with the sender of the hello message.
4) Check for session timeouts. If timeout has occurred, remove session and all of its label mappings.
5) Check for changes in the routing table. If a change has occurred, determine if mappings need to change. If mappings must also change,
   a) For new routes, request new labels from the downstream peer.
   b) For deleted routes, release labels from the downstream peer.
6) Go to step 2.

For each LDP session, the basic operation is as follows:
1) Initialize session with peer.
2) Receive messages:
   a) If a request is received, find an unused label and send a mapping back to the peer and place entry in Label Information Base (LIB) with the new entry as the input side and the stream prefix as the output side. If the stream prefix is being routed to an another MPLS peer, then request a label for the stream prefix.
   b) If a mapping is received, find any entry in the LIB for that stream, and place the label in the output side of the entry.
   c) If a withdraw message is received, find an entry in the LIB with an outgoing label that matches the withdraw message. Remove the entry and mark the label as unused.
   d) If a release message is received, find an entry in the LIB with an incoming label that matches the release message. Remove the entry and mark the label as unused. If the entry also had an outgoing label, send a release message for that label.
3) Go to step 2.

Software routines to implement the proceeding modules have been written and tested. A description of the functional and performance tests performed on an MPLS prototype are provided in provisional application Ser. No. 60/124,063, from which this patent claims the benefit of the filing date. For the purpose of brevity the description of the tests will not be repeated here. It is understood, however, that the provisional application is incorporated herein by reference as if reproduced in its entirety.

Figure 11:
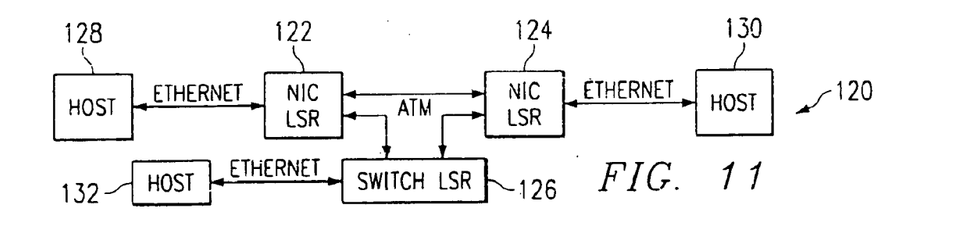
FIG. 11 shows a simplified network with three label switched routers.

In another aspect, the present invention also includes software for graphically displaying the status of a communication network, such as network 120 of FIG. 11. Since there is typically too much data to be put into comprehensible text form, this software is a particularly useful way of describing the network to people. In the preferred embodiment, the user can elect to view each of the separate circuits on demand. This functionality is especially useful to system administrators and others who must maintain and set up networks.

MPLS networks can be very complicated and difficult to analyze. Specifically, the list of IP stream to label mappings is very complicated since it involves lots of information from each Label Switched Router (LSR) in the network. This aspect of the present invention solves the problem by consolidating the information and providing a method for displaying the current state of the network graphically so that it can be easily analyzed. It is implemented as a computer program.

In order for labeling to work, adjacent routers must agree on which labels to use for each IP stream. The Label Distribution Protocol (LDP) is used to carry out this negotiation. The labels are only known to the LSRs at the two endpoints of a link. As the IP stream travels through the network, different labels will be used on each link. As a result, every IP steam will have a different sequence of labels for the links in the network between the starting point for the stream, the ingress, and the LSR where the stream leaves the MPLS network, the egress. An example is shown in FIGS. 12a and 12b.

Figure 12A:
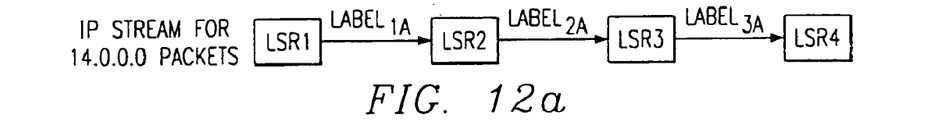
FIGS. 12a–12b show an exemplary labeling scheme for four LSRs in two different MPLS paths.

FIG. 12a shows that for the 14.0.0.0 IP stream starting at LSRI, the sequence of labels is:

<$Label_{1A}$, $Label_{2A}$, $Label_{3A}$>

Figure 12B:
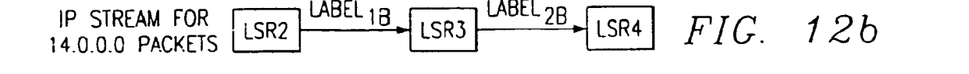

As shown in FIG. 12b, for the 14.0.0.0 IP stream starting with LSR2, the sequence of labels is:

<$Label_{1B}$, $Label_{2B}$>

If streams are not merged, then for each IP stream there will be a sequence of labels for each LSR in the MPLS network. Thus, the number of label sequences will grow quickly as the size of the network increases and as the number of IP streams increases. Furthermore, since the labels are only known to the LSRs on the ends of a link, a global view of the network labeling is not readily available.

The graphical interface for monitoring MPLS networks solves these problems by consolidating the information and displaying parts of it as needed.

Since displaying the complete set of label sequences for all IP streams and all ingress LSRs at the same time would overload the users abilities to analyze the information, the graphical interface acts as a query system implemented as a computer program. The system provides a mechanism for allowing the user to easily specify the ingress node and IP stream to find the label sequence for, and then graphically displays the results of the query. The system is set up as follows:

1) First the user specifies the IP addresses of the LSRs in the network that he wants to monitor. The user can save this list to a file so that it can be used again at a later time.

2) The system will display an icon for each LSR in the main window of the program. The user may position the icons as he or she chooses within the main window by clicking on the icons and dragging them to the desired location.

3) When the user selects the "Refresh" command, the system will query all of the LSRs specified by the user to find out their status. The system attempts to connect to the diagnostic ports of the LSRs using Transmission Control Protocol (TCP). Once all of the LSRs have been contacted, the icons for the LSRs will be colored a first color (e.g., green) for operational or a second color (e.g., red) for non-operational. Other indications are possible. Also, the links with valid LDP sessions will be shown as a line (e.g., black) between the two involved LSRs.

4) When the user wants to display the sequence of labels for an IP stream, she identifies the ingress LSR by clicking on its icon with the mouse. A dialogue box is shown to the user. The dialogue box contains a list of the IP streams that the specified LSR has mappings for. This list is determined by querying the LSR via its diagnostic port, similarly to step 3.

5) After the user selects the desired IP stream, the following procedure is carried out to display the results of the query:

a) The icon for the ingress LSR is colored with a distinctive color and/or a text message is displayed next to the icon indicating that the LSR is the "Ingress for IP stream=X.X.X.X" where "X.X.X.X" is the IP stream specified in step 5. The "current LSR" is set to the ingress LSR.

b) The system queries the current LSR for a label from the ingress LSR and for the IP stream specified in step 5. This query is also performed via the TCP diagnostic port.

i) If the response is empty the process is complete:
     (1) If the current LSR is not the ingress, then a text message is displayed next to the icon indicating that the LSR is the "Egress".
     (2) If the current LSR is the ingress, then there is no mapping for the IP stream.
   ii) If the response is not empty, then the response includes the label used and the name of the other LSR in the network to where the stream is going— i.e., the "destination" LSR. On the line between the current LSR and the destination LSR, arrow marks are drawn to show the direction of the stream flow and the label is displayed next to the line. The destination LSR is preferably colored a distinctive color. The destination LSR becomes the current LSR. The next action is found in step 5(b).

Figure 13:
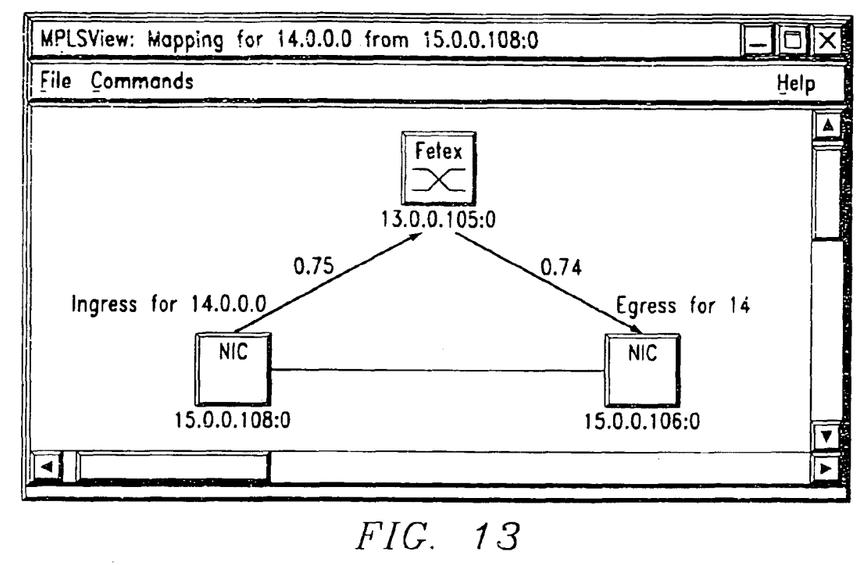
FIGS. 13 and 14 show exemplary screens for a monitoring software of the present invention.

FIG. 13 illustrates a display screen that would show the path for a three hop network. This screen demonstrates one of the useful features of this software, namely its ability to visually display the path through the network and the MPLS labels for different IP streams as shown below.

Figure 14:
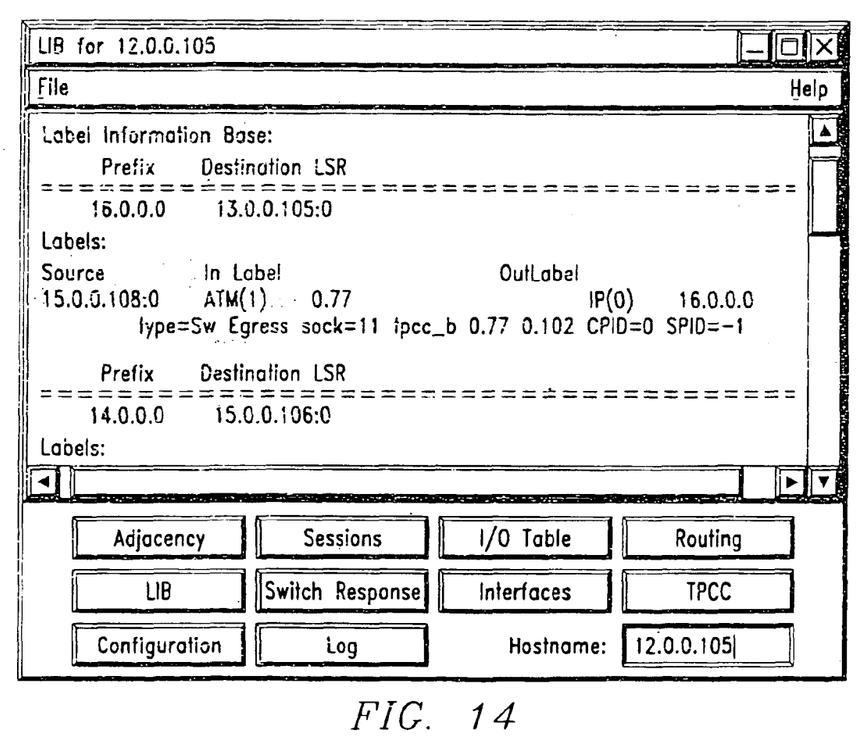

The software also provides detailed information on each LSR in the MPLS network. FIG. 14 illustrates this screen. Details for a specific implementation are provided below.

The software operates by first providing a picture of the network. The user then picks a path. The graphical interface program will query each of the elements in the network. The elements will in turn return label information. From this label information, the VPI.VCI labels can be attained.

In the preferred embodiment, the user will only view one circuit at a time. The invention, however, can be extended to view any number of circuits simultaneously. The only issue is that too many circuits may become unwieldy and difficult for the user to understand. This tradeoff can be made for each application, possibly by the useful herself.

This aspect of the present invention would be useful in a number of situations. For example, a network administrator can use it to verify which links in the network are operational. The software could also be used for training purposes or testing purposes. Also, the software could be incorporated into a billing system to verify bills to customers. It is envisioned that this software would be incorporated into the network management software that many vendors include with the equipment they sell.

In the preferred embodiment, the software provides a computer-implemented method of graphically displaying the labels for a labeled switched paths that are used to transmit an Internet Protocol (IP) stream. The software receives user information specifying an IP addresses of Label Switching Routers (LSRs) in the network that is to be monitored. These addresses can be stored in a non-volatile memory for future use. On the user's display, e.g., monitor, an icon can be shown for each element. In response to a refresh indication, e.g., a command from the user, each of the elements in the network is queried to determine the status of that element. The query can be made by connecting to a diagnostic port of each element using Transmission Control Protocol (TCP).

A visual indication of which elements are operational and which elements are non-operational can then be provided to the user. This can be accomplished by displaying an icon of a first color (e.g., green) for operational elements and an icon of a second color (e.g., red) for non-operational elements. In addition, for each pair of elements having a valid label distribution protocol session, a connection between the icons associated with each element in the pair can be displayed. An IP address can optionally be displayed for each element in the network to be monitored.

In the preferred embodiment, the user will maintain some level of control over the graphical presentation. For example, the position of the icons can be changed in response to an indication by the user. The user might provide this indication by clicking on an icon and dragging the icon to a new position.

The graphical display software is applicable to edge routers as well as core routers. For instance, the user might indicate a desire to display a sequence of labels for a selected IP stream. The software would determine an ingress element for the selected IP stream. For example, the user might indicate which element is the ingress element by clicking on the icon of the ingress element. Typically the ingress element is handling a plurality of IP streams in addition to the selected IP stream.

The graphical display software has been implemented in a Java-based program (called "MPLSView") that monitors an MPLS network. In the implemented embodiment, a number of menu commands are utilized. The upper level menus (File and Commands) are shown in the screen display in FIG. 13. These are explained now.

File:
  Load View: This command loads a data file that contains a set of LSR definitions.
  Save View: This command saves the current set of LSR definitions in a file.
  Exit: This command exits the software without changing the status of the Label Switched Routers (LSRs).
Commands:
  Refresh: This command refreshes the adjacency view of the graph. Active LSRs and LDP sessions are shown as black squares and lines respectively. Disabled LSRS are shown as red squares.
  Mapping: This command shows the path through the network for a given IP stream starting from a specific LSR. The Ingress LSR will be shown in green, and the path and other LSRs will be shown in blue. The ATM label used for each link will also be shown. This command can also be activated be clicking on the desired starting LSR.
  Detailed: This command will allow the user to see a detailed view of the specified LSR. This command can also be activated by clicking on the desired LSR with the <shift>key pressed.
  Add LSR: This command allows the user to add a new LSR to the view. The IP address, the Label Space Name (LSN), and the position of the LSR are to be given. Once an LSR is included in the view, it can be repositioned by dragging the LSR to a new location.
  Delete LSR: This command allows the user to remove an LSR from the view. This command can also be activated by clicking on desired LSR while the <ctrl>key is pressed.
  Space LSRs Evenly: This command aligns the LSR in the view evenly.
  Help: This command provides standard help information.

For the detailed view shown in FIG. 13, there is an array of command buttons. (These buttons can also be implemented in a pull down window). The commands are described now.
  Adjacency: This command shows the adjacencies for the LSR.
  Sessions: This command shows the details of all of the sessions for the LSR.
  I/O Table: This command shows the I/O table for the LSR.
  Routing: This command shows the routing table entries identified by the LSR.
  LIB: This command shows the Label Information Base (LIB) for the LSR.
  Switch Response: This command shows the last response of the ATM (e.g., Fore) switch.
  Interfaces: This command shows the interfaces for the LSR.
  TPCC: This command shows the list of pending TPCC connection requests.
  Configuration: This command shows the configuration file of the LSR.
  Log: This command shows the log file of the LSR.
  Hostname: This command lets the user specify the IP address of the LSR to query.

In the preferred embodiment, the software also include diagnostic capabilities. These diagnostic capabilities are described in greater detail in the provisional application, which is incorporated herein by reference.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A communications device comprising:
  a general purpose computer including at least one central processor, a memory storing program instructions to be executed by the processor, a user input/output mechanism coupled to the central processor, and a plurality of expansion slots coupled to the central processor through a bridge circuit; and
  at least one network interface card plugged into one of the expansion slots and being controlled, at least in part, by the processor, wherein the at least one network interface card comprises an ATM (Asynchronous Transfer Mode) card;
  wherein the program instructions executed by the processor enable the communications device to implement multiprotocol label switching (MPLS) using label distribution protocol to communicate with other communications devices, the program instructions including:
  a set of computer instructions for determining that the memory stores an outgoing packet;
  a set of computer instructions for assigning a VPI.VCI (virtual path identifier. virtual circuit identifier) label to the outgoing packet; the VPI.VCI label assigned using label distribution protocol;
  a set of computer instructions for forwarding the packet to the ATM network interface card to be output with the VPI.VCI label;
  a set of computer instructions for receiving an incoming packet on an incoming channel, the incoming packet being an IP (Internet Protocol) packet labeled with a VPI.VCI label; and
  a set of computer instructions for forwarding the incoming packet to an IP handler, the IP handler comprising software instructions operating on the general purpose computer.

2. The device of claim 1 wherein the memory further stores an operating system with computer instructions to be executed by the processor, the operating system comprising a Linux operating system.

3. The device of claim 1 wherein communications device comprises a core label switched router, the communications device receiving an IP packet labeled with a VPI.VCI label and forwarding the IP packet using a second VPI.VCI label.

4. The device of claim 1 wherein the program instructions further comprise a set of computer instructions for opening the endpoint of an ATM permanent virtual circuit (PVC) on the ATM network interface card coupled to a downstream label switch router, characteristics of endpoint being specified by label distribution protocol.

5. The device of claim 4 wherein the program instructions further comprise a set of computer instructions for closing the PVC connection when the connection is no longer needed.

6. The device of claim 1 wherein the program instructions further comprise a set of computer instructions for instructing an operating system kernel executing on the central processor to send IP packets on the destination virtual circuit that corresponds to an MPLS label that is associated with a class of IP packets.

7. The device of claim 1 wherein the program instructions further comprise a set of computer instructions for translating the VPI.VCI label to an IP address and forwarding the packet to a non-MPLS downstream router.

8. The device of claim 1 and further comprising an Ethernet card plugged into one of the expansion slots.

9. A computer readable storage medium for storing a computer program, the computer program comprising computer instructions for:

determining that an Internet Protocol (IP) stream can be utilize multiprotocol label switching (MPLS);

requesting a VPI.VCI label from a downstream label switching router (LSR), the requesting being made using label distribution protocol;

associating the IP stream with a VPI.VCI label received from the downstream LSR;

opening an ATM PVC (asynchronous transfer mode permanent virtual connection) connection on an ATM NIC (network interface card) connected to the downstream LSR, the PVC connection associated with the VPI.VCI label received from the downstream LSR; and instructing an operating system kernel to send IP packets with a destination that matches the IP prefix of the received IP stream to the PVC connection.

10. The storage medium of claim 9 and further comprising computer instructions for:

receiving an IP packet from a upstream LSR; and forwarding the received IP packet to the downstream LSR via the ATM NIC, the forwarding being based upon the VPI.VCI label.

11. The storage medium of claim 9 wherein the computer program further comprises computer instructions for closing the PVC connection when the connection is no longer needed.

12. The storage medium of claim 9 wherein the storage medium is fixedly attached within the housing of a general purpose computer.

13. The storage medium of claim 9 wherein the computer readable memory comprises a RAM.

14. The storage medium of claim 13 wherein the storage medium comprises a DRAM.

15. The storage medium of claim 13 wherein the storage medium comprises a non-volatile memory.

16. The storage medium of claim 15 wherein the storage medium comprises a hard drive.

17. The storage medium of claim 15 wherein the storage medium comprises a CD-ROM.

18. The storage medium of claim 9 wherein the storage medium comprises more than one physical memory device.

19. A computer readable storage medium for storing a computer program, the computer program comprising computer instructions for:

receiving a request for a VPI.VCI (virtual path identifier.virtual circuit identifier) label from a upstream label switched router (LSR), the request using label distribution protocol;

determining a VPI.VCI label for the given Internet Protocol (IP) stream;

communicating the VPI.VCI label for the given IP stream to the upstream LSR, the communicating using label distribution protocol;

opening an endpoint of an ATM PVC (asynchronous transfer mode permanent virtual connection) on an ATM NIC (network interface card) connected from the upstream LSR, the ATM PVC connection utilizing the VPI.VCI label;

instructing an operating system kernel to send packets received at the PVC connection at the ATM NIC to an IP input handler; and forwarding the packet of information to a downstream router, the forwarding being based upon the IP address.

20. The storage medium of claim 19 wherein the storage medium is fixedly attached within the housing of a general purpose computer.

21. The storage medium of claim 19 wherein the storage medium comprises a dynamic random access memory.

22. The storage medium of claim 19 wherein the storage medium comprises a non-volatile memory.

23. The storage medium of claim 22 wherein the storage medium comprises a hard drive.

24. The storage medium of claim 22 wherein the storage medium comprises a CD-ROM.

25. A computer readable storage medium for storing a computer program, the computer program comprising computer instructions for:

receiving a request from a upstream LSR that the upstream LSR wants to send a given IP stream, the request using label distribution protocol;

requesting that a downstream LSR provide a label for the given IP stream, the request using label distribution protocol;

receiving an outgoing VPI.VCI label from the downstream LSR, the receiving using label distribution protocol;

sending an incoming VPI.VCI label to the upstream LSR, the receiving using label distribution protocol;

opening a first ATM PVC connection on an incoming ATM NIC connected to the upstream LSR, the ATM PVC connection utilizing the incoming VPI.VCI label;

opening a second ATM PVC connection on an outgoing ATM NIC connected to a downstream LSR, the ATM PVC connection utilizing the outgoing VPI.VCI label; and instructing an operating system kernel to send packets received at the first PVC connection to the second PVC connection.

26. The storage medium of claim 25 wherein the storage medium is fixedly attached within the housing of a general purpose computer.

27. The storage medium of claims 25 wherein the computer readable memory comprises a DRAM.

28. The storage medium of claim 25 wherein the storage medium comprises a non-volatile memory.

29. The storage medium of claim 28 wherein the storage medium comprises a hard drive.

30. The storage medium of claim 28 wherein the storage medium comprises a CD-ROM.

31. A communication device comprising:
   a non-MPLS enabled ATM switch including ATM inputs and ATM outputs; and
   a general purpose computer coupled to the non-MPLS enabled ATM switch, the general purpose computer executing software to communicate with the non-MPLS enabled ATM switch through third party call control, the general purpose computer executing software that enables the non-MPLS enabled ATM switch to utilize MPLS.

32. A method of implementing label switched router that includes a on-MPLS enabled asynchronous transfer mode (ATM) switch and an attached processor, the method comprising:
   determining that an IP (Internet Protocol) stream can utilize MPLS;
   requesting a VPI.VCI label from a downstream label switching router (LSR), the requesting being made using label distribution protocol;
   associating the IP stream with a VPI.VCI label received from the downstream LSR;
   assigning a local label to be used for a connection between the attached processor and a switch port of the ATM switch, the local label being assigned by the attached processor and the switch port of the ATM switch being connected to the downstream LSR;
   creating a switched virtual circuit connection (SVC) from the attached processor to the switch port of the ATM switch using the local label, the switched virtual circuit connection being signaled using TPCC;
   instructing an operating system kernel to send IP packets with a destination that matches the IP prefix of the received IP stream to the SVC; and
   sending IP packets from a memory within the attached processor to a NIC card in the attached processor with the local label; and
   sending IP packets from the NIC card in the attached processor to the ATM switch.

33. The method of claim 32 and wherein sending a setup message comprises sending a Q.2931 setup message from the attached processor to the ATM switch.

34. A method of using label switched router that includes a non-MPLS enabled asynchronous transfer mode (ATM) switch and an attached processor, the method comprising:
   receiving a request for a VPI.VCI (virtual path identifier.virtual circuit identifier) label from a upstream LSR, the request using label distribution protocol;
   determining a VPI.VCI label for the given IP stream;
   communicating the VPI.VCI label for the given IP stream to the upstream LSR, the communicating using label distribution protocol;
   assigning a local label to be used for a connection between the attached processor and the ATM switch, the local label being assigned by the attached processor;
   creating a switched virtual circuit connection from the attached processor using the local label to the external interface using the external label; the switched virtual circuit connection being signaled using TPCC;
   instructing the operating system kernel of the attached processor to send packets received at the switched virtual circuit connection at an ATM NIC of the attached processor to an IP input handler; and
   forwarding the packet of information to a downstream router, the forwarding being based upon the IP address.

35. The method of claim 34 and further comprising sending the incoming IP stream from the attached processor to a destination router.

36. The method of claim 35 wherein the incoming IP stream is sent from the attached processor to a non-MPLS link.

37. The method of claim 36 wherein the non-MPLS link comprises an Ethernet link.

38. The method of claim 36 wherein the non-MPLS link comprises a link selected from the group consisting of a PPP dial modem connection, a token ring link, DEC net link, an apple talk link, and an ATM link.

39. The method of claim 34 and wherein the attached processor listens for incoming packets on the on the local virtual connection and sends all of the incoming packets to an IP layer of a protocol stack.

40. The method of claim 34 and further comprising, closing the external virtual connection when the external virtual connection is no longer needed, wherein the external virtual connection is caused to be closed by sending a Q.2931 release message from the attached processor to the ATM switch.

41. A method of using label switched router that includes a non-MPLS enabled asynchronous transfer mode (ATM) switch and an attached processor, the method comprising:
   receiving a request from a upstream LSR that the upstream LSR wants to send a given IP stream, the request using label distribution protocol;
   requesting that a downstream LSR provide a label for the given IP stream, the request using label distribution protocol;
   receiving an outgoing VPI.VCI label from the downstream LSR, the receiving using label distribution protocol;
   sending an incoming VPI.VCI label to the upstream LSR, the receiving using label distribution protocol; and
   creating a switched virtual circuit connection from an ATM switch interface connected to the upstream using the incoming label to an ATM switch interface connected to the downstream using the outgoing label, the switched virtual circuit connection being signaled using TPCC.

42. The method of claim 41 wherein the label switched router determines that is a core router for the incoming IP stream by using label distribution protocol with both the upstream and the downstream.

43. A computer-implemented method of graphically displaying the labels for a virtual connection that is used to transmit an Internet Protocol (IP) stream, the method comprising:
   receiving user information specifying IP addresses of elements in a network that are to be monitored;
   displaying an icon for each element;
   in response to a refresh indication, querying each of the elements in the network to determine a status for each element;
   providing a visual indication of which elements are operational and which elements are non-operational; and
   for each pair of elements having a valid label distribution protocol session, displaying a connection between the icons associated with each element in the pair.

44. The method of claim 43 and further comprising saving the IP addresses of elements in a network to a non-volatile storage medium.

45. The method of claim 43 and further comprising changing the position of the icons in response to an indication by the user.

46. The method of claim 45 wherein the indication by the user comprises clicking on an icon and dragging the icon to a new position.

47. The method of claim 43 wherein the refresh indication is in response to a refresh command from the user.

48. The method of claim 43 wherein querying each of the elements to determine a status comprises connecting to a diagnostic port of each element.

49. The method of claim 43 wherein providing a visual indication of which elements are operational and which elements are non-operational comprises displaying an icon of a first color for operational elements and an icon of a second color for non-operational elements.

50. The method of claim 43 and further comprising:
receiving an indication from the user to display a sequence of labels for a selected IP stream;
determining an ingress element for the selected IP stream, the ingress element handling a plurality of IP streams beside the selected IP stream; and
determining which of the plurality of IP streams is the selected IP stream;
displaying a label the connection between the ingress element and a downstream element; and
displaying a label for the each other hop between elements in the IP stream an egress point is reached.

51. The method of claim 50 wherein determining the ingress element comprises receiving an indication from the user as to which element is the ingress element.

52. The method of claim 51 wherein the user indicates which element is the ingress element by clicking on the icon of the ingress element.

53. The method of claim 50 wherein determining which of the plurality of IP streams is the selected IP stream comprises:
providing a list of the plurality of IP streams to the user; and
receiving an indication from the user as to which IP stream is the selected IP stream.

54. The method of claim 53 wherein providing a list of the plurality of IP streams comprises querying the ingress element via its diagnostic port.

55. The method of claim 50 and further comprising querying each of the elements in a label switched path for the IP stream to determine the label associated with a connection to that element.

56. The method of claim 50 and further comprising labeling the icon associated with an egress element.

57. The method of claim 43 and further comprising displaying an IP address for each element in the network to be monitored.

58. A computer readable storage medium for storing a computer program, the computer program comprising computer instructions for graphically displaying the labels for a label switched path that is used to transmit an Internet Protocol (IP) stream, the computer program comprising:
a set of computer instructions for receiving user information specifying IP addresses of elements in a network that are to be monitored;
a set of computer instructions for causing an icon for each element to be displayed;
a set of computer instructions for querying each of the elements in the network to determine a status for each element;
a set of computer instructions for providing a visual indication of which elements are operational and which elements are non-operational; and
a set of computer instructions for displaying a connection between the icons associated with each element in a pair of elements having a valid label distribution protocol session.

59. The storage medium of claim 58 wherein the storage medium is one component in a communication device that further comprises a controller, a volatile memory coupled to the controller and a plurality of communication units coupled to the controller.

60. The storage medium of claim 59 in combination with the controller, the volatile memory and the communication units, the storage medium coupled for access by the controller.

61. The storage medium of claim 59 wherein the communication device comprises an ATM switch.

62. The method of claim 34 and wherein sending a setup message comprises sending a Q.2931 setup message from the attached processor to the ATM switch.

* * * * *

UNITED STATES PATENT AND TRADEMARK OFFICE
CERTIFICATE OF CORRECTION

PATENT NO. : 6,885,677 B1  Page 1 of 1
APPLICATION NO. : 09/674315
DATED : April 26, 2005
INVENTOR(S) : Richard L. Klevans It is certified that error appears in the above-identified patent and that said Letters Patent is hereby corrected as shown below:

Column 5, Line 6, after "from NIC", insert -- 30 --.
Column 5, Line 49, after "to be", delete "send" and insert -- sent --.
Column 5, Line 59, after "output", insert -- . --.
Column 6, Line 15, after "prefix", delete "nd" and insert -- and --.
Column 9, Line 55, after "LSR", insert -- . --.
Column 10, Line 6, after "downstream", delete "LSRS" and insert -- LSRs --.
Column 11, Line 28, after "embodiment, the", delete "STML" and insert -- STLM --.
Column 11, Line 59, after "STLM", delete "SP" and insert -- will --.
Column 11, Line 61, after "entries.", delete "This" and insert -- While this --.
Column 12, Line 28, after "mapping", insert -- to --.
Column 13, Line 1, after "and the", delete "ELM" and insert -- ILM --.
Column 13, Line 45, after "handlers", delete "SP".
Column 13, Line 47, after "event", delete "handler SP" and insert -- handlers --.
Column 13, Line 52, after "handler", delete "10" and insert -- 110 --.
Column 15, Line 5, after "at", delete "LSRI" and insert -- LSR1 --.
Column 15, Line 21, after "overload the", delete "users" and insert -- user's --.
Column 16, Line 34, after "the", delete "useful" and insert -- user --.
Column 17, Line 29, after "Disabled", delete "LSRS" and insert -- LSRs --.
Column 17, Line 36, after "activated", delete "be" and insert -- by --.
Column 18, Line 47, Claim 1, after "packet", delete ";" and insert -- , --.
Column 21, Line 12, Claim 32, after "a", delete "on-" and insert -- non- --.
Column 22, Line 11, Claim 39, after "packets", delete "on the".

Signed and Sealed this

Fifteenth Day of August, 2006

JON W. DUDAS
*Director of the United States Patent and Trademark Office*